United States Patent Office.

CHARLES L. COOMBS, OF WASHINGTON, DISTRICT OF COLUMBIA.

Letters Patent No. 94,079, dated August 24, 1869.

---

IMPROVED COMPOSITION FOR GUMMING POSTAGE AND REVENUE-STAMPS.

---

Schedule referred to in these Letters Patent and making part of the same.

---

To all whom it may concern:

Be it known that I, CHARLES L. COOMBS, of the city of Washington, in the District of Columbia, have invented a new and useful Improvement in Composition for Gumming Postage and Revenue-Stamps, and Envelopes; and I do hereby declare that the following is a full, clear, and exact description thereof.

My invention consists in applying to the backs of stamps, or to the flaps of envelopes, a mucilage, consisting of tannin and gelatine, either alone or in combination with albumen.

This compound may be formed in various ways, not differing essentially, however, in principle.

I take a solution of gelatine in hot water, and add to it, drop by drop, or slowly, a solution of tannin, until nearly all the gelatine is precipitated.

I then heat the mass to about 212° Fahrenheit, and stir until the precipitate is dissolved.

The mucilage may also be prepared by adding to a warm solution of gelatine, a solution of tannin in excess, until all the gelatine is precipitated. This precipitate is washed, and sufficient gelatine added to dissolve it by the aid of heat.

The compound may be applied to the stamp or other article, while warm, with a brush, or in any other manner desirable.

Upon drying, it assumes the appearance of the ordinary gumming, and when moistened and attached to any material, cannot be removed without destroying the stamp, by the action of any of the solvents, such as water, alcohol, &c.

I have found it advantageous to combine albumen, in many cases, with the above composition. To effect this, I allow the composition to cool to between 120° and 130° Fahrenheit, and add the albumen in solution, in various proportions to suit the requirements of the case.

Having thus described my invention,

What I claim as new, and desire to secure by Letters Patent, is—

1. The method or process of forming mucilage for stamps, envelopes, and similar articles, by compounding tannin and gelatine, with or without albumen, in the manner substantially as herein described.

2. Also, as a new manufacture for coating stamps, envelopes, and similar articles, a mucilage formed by compounding gelatine and tannin, with or without albumen, substantially in the manner herein described.

3. Also, as a new article of manufacture, stamps, envelopes, and similar articles, coated with a mucilage formed by compounding tannin and gelatine, with or without albumen, substantially as herein described.

CHAS. L. COOMBS.

Witnesses:
   Jos. L. COOMBS,
   WM. KESLEY.